(12) United States Patent
Polegato

(10) Patent No.: US 6,389,711 B1
(45) Date of Patent: May 21, 2002

(54) VAPOR-PERMEABLE SHOE

(75) Inventor: Mario Polegato, Crocetta del Montello (IT)

(73) Assignee: Nottington Holding B. V., Amsterdam (NL)

( * ) Notice: Subject to any disclaimer, the term of this patent is extended or adjusted under 35 U.S.C. 154(b) by 0 days.

(21) Appl. No.: 09/423,299

(22) PCT Filed: Apr. 29, 1998

(86) PCT No.: PCT/EP98/02537

§ 371 Date: Nov. 9, 1999

§ 102(e) Date: Nov. 9, 1999

(87) PCT Pub. No.: WO98/51177

PCT Pub. Date: Nov. 19, 1998

(30) Foreign Application Priority Data

May 9, 1997 (IT) .......................... PD97A0102

(51) Int. Cl.[7] .................... A43B 7/06; A43B 13/12; A43B 23/07; A43B 13/38
(52) U.S. Cl. .................. 36/3 R; 36/44; 36/30 R; 36/55; 36/3 B
(58) Field of Search .................. 36/3 R, 3 B, 30 R, 36/30 A, 75 R, 45, 55, 4, 44

(56) References Cited

U.S. PATENT DOCUMENTS

| | | | | |
|---|---|---|---|---|
| 4,071,963 A | * | 2/1978 | Fukuoka | 36/3 B |
| 4,481,726 A | * | 11/1984 | Phillips | 36/30 R |
| 4,507,880 A | * | 4/1985 | Ohashi | 36/3 B |
| 4,663,865 A | * | 5/1987 | Telcemian | 36/30 R |
| 4,837,948 A | * | 6/1989 | Cho | 36/3 A |
| 4,899,465 A | * | 2/1990 | Bleimhofer et al. | 36/3 B |
| 4,906,502 A | * | 3/1990 | Rudy | 36/3 R |
| 5,465,508 A | * | 11/1995 | Bourdeau | 36/3 B |
| 5,655,314 A | * | 8/1997 | Petracci | 36/3 B |
| 5,746,012 A | * | 5/1998 | Caletti et al. | 36/3 B |
| 5,921,003 A | * | 7/1999 | Kim | 36/3 B |
| 5,979,076 A | * | 11/1999 | Li | 36/3 B |
| 5,983,524 A | * | 11/1999 | Polegato | 36/3 R |
| 5,992,052 A | * | 11/1999 | Moretti | 36/3 B |

* cited by examiner

*Primary Examiner*—Anthony Stashick
(74) *Attorney, Agent, or Firm*—Oblon, Spivak, McClelland, Maier & Neustadt, P.C.

(57) ABSTRACT

A vapor-permeable shoe comprising the following combination of elements: a vapor-permeable upper (11) associated with a vapor-permeable or perforated lining (12); a tread sole (13) made of perforated elastomer, a mid-sole, comprising at least one membrane (15) made of waterproof and vapor-permeable material associated with a lower protective layer (16) made of a material resistant to hydrolysis, the layer being water-repellent, vapor-permeable and/or perforated; a vapor-permeable or perforated insole (17); a vapor-permeable or perforated filler (19) layer arranged between said insole and said membrane. The membrane is associated and sealed, at its edge regions, to a pre-molded insert (14) which is suitable to form a perimetric support for the membrane both during assembly and during use.

39 Claims, 4 Drawing Sheets

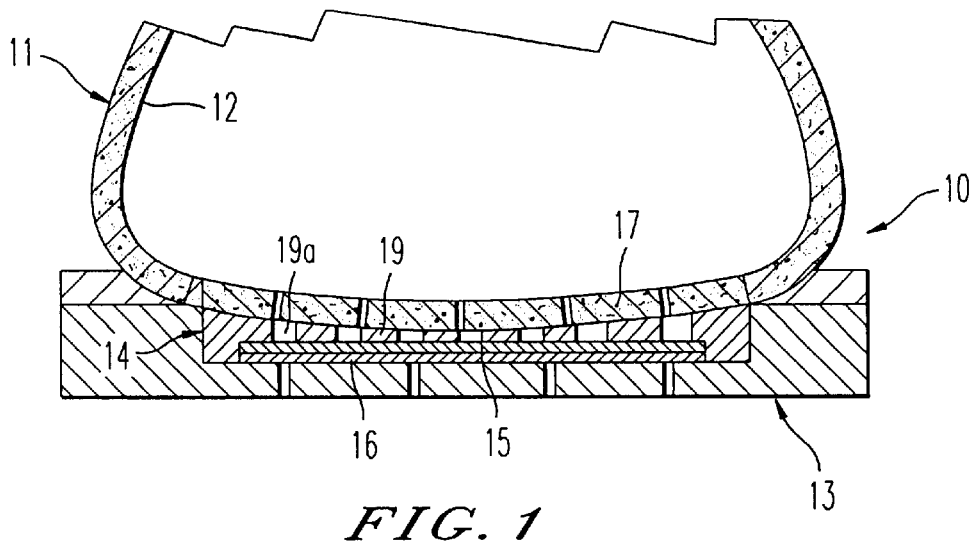
FIG. 1
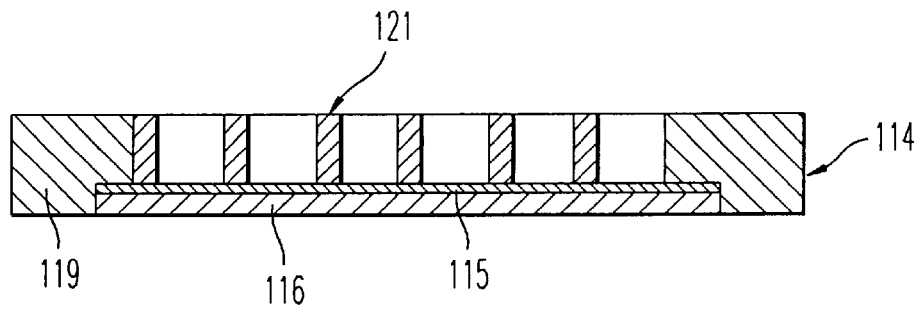
FIG. 2
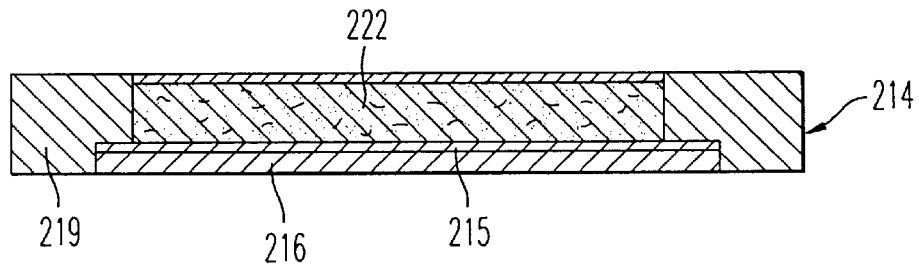
FIG. 3
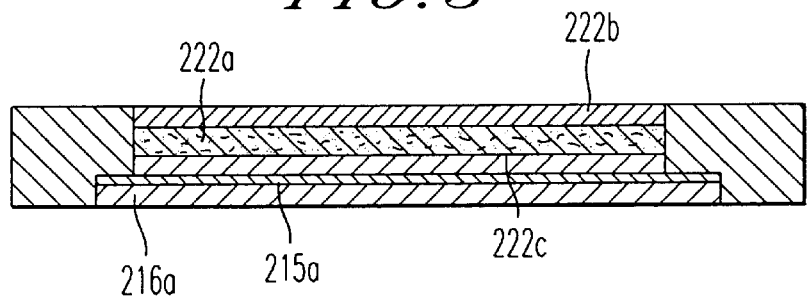
FIG. 3bis

VAPOR-PERMEABLE SHOE

CROSS-REFERENCE TO RELATED APPLICATION

This application claims priority under 35 U.S.C. §119 to Italian Application No. PD97A000102 filed May 9, 1997. The contents of that application are incorporated herein by reference in their entirety.

BACKGROUND OF THE INVENTION

1. Field of the Invention

The present invention relates to an improved vapor-permeable shoe.

2. Description of the Background

It is currently known that a shoe, in order to be comfortable, must ensure correct exchange of heat and water vapor between the microclimate inside the shoe and the external microclimate.

However, such heat and water-vapor exchanges must not compromise in any case the impermeableness of the shoe to external moisture or water.

In currently commercially available shoes, heat and water-vapor exchanges are substantially entrusted either to the upper portion of the shoe (upper) or to the sole.

As regards the upper portion of the shoe, shoes which have perforated uppers and/or are provided with linings made of vapor-permeable and waterproof material are currently commercially available.

Indeed, in some models, part of the upper may be replaced with materials which are indeed waterproof and at the same time vapor-permeable.

Another category of shoes instead entrusts transpiration to the sole, by using layers of materials which are impermeable to water and are vapor-permeable, optionally associated with protective layers and with fillers.

In order to achieve optimum exchange of heat and water vapor, a vapor-permeable shoe has been conceived which is disclosed in Italian Invention Patent Application No. PD95A000190 filed on Oct. 13, 1995 and comprises the following combination of elements:

- a vapor-permeable upper associated with a vapor-permeable or perforated lining;
- a tread sole made of perforated elastomer;
- a mid-sole which comprises at least one membrane made of vapor-permeable waterproof material which is associated with a lower protective layer made of a material resistant to hydrolysis, water-repellent and vapor-permeable or perforated;
- a vapor-permeable or perforated insole;
- a vapor-permeable or perforated filler layer arranged between the insole and the membrane.

In the shoe as disclosed in Italian Invention Patent Application No. PD95A000190 filed on Oct. 13, 1995, the lower part of the upper, the thread sole and the mid-sole with the membrane are perimetrically sealed in their coupling regions. Said shoe has solved the problem of the transpiration of heat and water vapor, but it still entails some marginal drawbacks mostly during manufacture. This is because it is rather difficult to insert the rather delicate waterproof membrane precisely, safely and without damage during the assembly of the mid-sole.

Moreover, during use, the membrane, especially in shoes used in particularly demanding situations, may be subjected to such stresses as to produce undesirable damage thereto.

SUMMARY OF THE INVENTION

The aim of the present invention is to provide a vapor-permeable shoe which combines the possibility of providing heat and water-vapor exchange both through the upper and through the sole, ensuring at all times an optimum internal microclimate as a function of the external climate, with improved simplicity and precision of execution during manufacture.

Within the scope of this aim, an object of the present invention is to provide a vapor-permeable shoe in which the membrane specifically assigned to the transpiration function is protected effectively even if the shoe is used in situations which are particularly demanding as to mechanical stresses, such as in the field of sports and in the field of working shoes.

Another object of the present invention is to provide a vapor-permeable shoe which is meant both for day-to-day use and for sports use.

Another object of the present invention is to provide a vapor-permeable shoe having a competitive cost with respect to conventional vapor-permeable shoes.

Another object of the present invention is to provide a vapor-permeable shoe which can be manufactured with known technologies.

This aim, these objects and others which will become apparent hereinafter are achieved by a vapor-permeable shoe comprising the following combination of elements:

- a vapor-permeable upper which is associated with a vapor-permeable or perforated lining;
- a tread sole made of perforated elastomer;
- a mid-sole which comprises at least one membrane made of waterproof and vapor-permeable material which is associated with a lower protective layer made of a material resistant to hydrolysis, water-repellent and vapor-permeable and/or perforated;
- a vapor-permeable or perforated insole;
- a vapor-permeable or perforated filler layer arranged between said insole and said membrane,
- said shoe being characterized in that said membrane is arranged in a preassembled insert, to which it is sealed at its edge regions, said insert being suitable to provide support for said membrane both during assembly and during use.

This invention also concerns a vapor-permeable, water-repellant or waterproof, preassembled insert capable of being precisely and easily included into a sole assembly during manufacture of a shoe. The insert comprises a vapor-permeable, waterproof membrane having upper and lower faces and an edge face, a vapor-permeable or perforate protective layer adjacent to and in contact with said lower face, and a waterproof supporting grid adjacent to and in contact with said membrane, said supporting grid being bonded to said membrane at least at the periphery of said membrane. The bonding may be accomplished at the perimeter of said upper face of said membrane, at the perimeter of said edge face or at the perimeter of both said upper face and said edge face.

BRIEF DESCRIPTION OF THE DRAWINGS

Further characteristics and advantages of the vapor-permeable shoe according to the present invention will become apparent from the following detailed description of various embodiments thereof, illustrated by way of non-limitative example in the accompanying drawings, wherein:

FIG. 1 is a transverse sectional view of a shoe according to the invention in a first embodiment;

FIGS. 2 to 5 are sectional views of respective variations of an insert included within the shoe of FIG. 1;

DETAILED DESCRIPTION OF THE PREFERRED EMBODIMENTS

Figure 4:
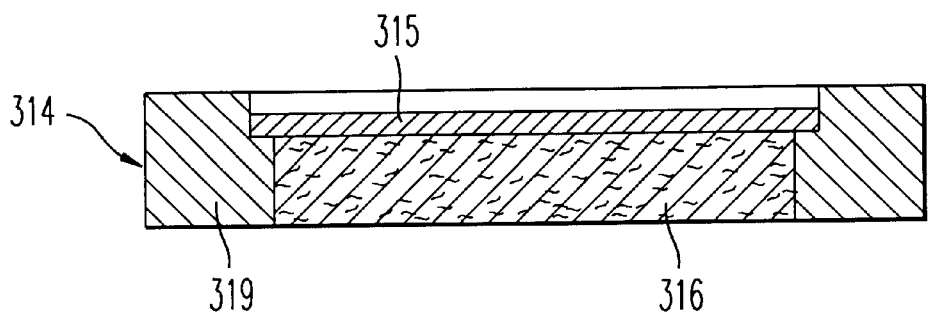

With particular reference to FIG. 1, a vapor-permeable shoe according to the invention is generally designated by the reference numeral 10 in a first embodiment.

In this case, the shoe 10 comprises an upper 11 which is vapor-permeable (for example made of natural hide without sealing pigments), associated with a lining 12 which is vapor-permeable or perforated (for example made of Cambrelle).

The lining 12 is associated with the upper 11 by spot gluing so as to avoid compromising transpiration through said upper.

The shoe 10 further comprises a tread sole 13 made of elastomer, which is perforated in a downward region, and a mid-sole which is generally designated by the reference numeral 14.

In this case, the mid-sole 14 comprises a membrane 15 made of vapor-permeable waterproof, Teflon material, such as those commercially available and known by the trade-name Gore-Tex, associated with a protective layer 16 which is directed towards the tread sole 13 and is made of a material resistant to hydrolysis, water-repellent, vapor-permeable or perforated. Alternatively, the vapor-permeable waterproof material may be polyurethane or a polyester commercially available and known by the trade-name Sympatex.

Membranes used to prepare the vapor-permeable, waterproof material generally have a thickness in the range of 10 to 50 microns. Such membranes are usually sold by the manufacturer as coated large meshed and light "tricots".

Protective layers for the waterproof film may be formed of fast drying non-woven fabric, e.g. polyester having a thickness ranging from 0.8 to 5 millimeters thick. For conventional shoes, a thickness of 1 millimeter is satisfactory. For shoes used in heavy duty applications, such as trekking and working boots, a protective layer thickness of 4 to 5 millimeters or more is satisfactory.

The shoe 10 further comprises, in this case, an insole 17 made of vapor-permeable material (for example natural leather) which is perforated and is optionally associable with a heel seat made of soft hide with absorbent rubber latex, not shown. The insole 17 is applied to the upper 11 through the classic system called "lasting", that is through a "cap-like" matching of a spreaded upper to a last, to which an insole is applied with nails in the area of the sole. Then, through stretching and spreading, the perimetric parts of the upper are glued on those of the insole along the entire perimeter of the insole. In this way, the upper takes the shape of the last. The outsole or tread sole 13 is then applied.

In this first embodiment, according to the invention, the mid-sole 14 is a pre-molded or in any case preassembled insert to which the tread sole 13 is joined by gluing with a perimetric sealing action or by overmolding.

Said insert/mid-sole 14 which in this case comprises not only the membrane 15 and the protective layer 16 but also a supporting/sealing element 19 which affects the upper and edge regions of the membrane 15, has through holes 19a in its upper region and acts as a filler layer.

The membrane 15 and the protective layer 16 are sealed at the edge regions to the element 19, which is made of elastomeric material (for example polyurethane) and is suitable to form a support for said membrane both during assembly and during use. The attachment may be by overmolding without glues. Similar results may be achieved by a) pre-molding or pre-shaping of the element 19 and subsequent waterproof gluing to the membrane 15, b) superinjection or high frequency or ultrasound welding with the help of liquid glues (e.g., single-component, hydrolysis-resistant polyurethane) or solid, thermic- or electro-weldable glues (films).

In this embodiment it is also possible to apply to the shoe 10 a tip, not shown, which is vapor-permeable or perforated and is associated with the upper 11 by means of spots of glue so as to ensure its transpiration properties.

Likewise, a vapor-permeable or perforated rear counter, also not shown, can be associated with the upper 11 by means of spots of glue.

The upper 11, in this case, is associated with the insole 17 by applying a bond-like layer of glue along the perimeter of the insole.

Limiting the gluing layer to a perimetric band preserves the vapor-permeability of most of the surface of the insole.

Thus, in the shoe 10, the central part of the insole is in fact entirely free of any element which is impermeable to water vapor (i.e., non-vapor-permeable).

The membrane 15 and the lower protective layer 16 are mutually coupled by spot gluing by using an adhesive which is commercially available and is resistant to hydrolysis (a kind commonly known as "hot melt", or systems with calendered powders).

The protective layer 16 can be conveniently made of water-repellent material which is capable of drying quickly. Such material includes for example non-woven fabric, preferably polyester, needle-loomed fabric or Kevlar.

The protective layer 16 is directed downward, i.e., towards the tread sole 13, since it must protect the membrane 15 against external impacts or foreign objects which might penetrate through the holes formed in said tread sole 13.

Moreover, the membrane 15 is substantially sealed perimetrically by the connection to the element 19, which is overmolded thereon during production. Alternatively, the seal can be produced by perimetric gluing of the upper perimetric surface and/or edge of membrane 15 to element 19 with hydrolysis-resistant adhesives.

Therefore, the connection between the membrane 15 and the element 19 occurs either without using adhesives, or with adhesives only in the perimetric part. This affords ample surface of the membrane free of covering or coating so as to permit transpiration of moisture vapors.

Moreover, the entire insert/mid-sole 14 can be provided so as to be modular, being usable for various soles and for various sizes. If desired the inserts may be shaped to accommodate the shape of "left" and "right" shoes.

Moreover, it is noted that the insert/mid-sole 14 is easy to insert in the sole, thus facilitating the positioning of the membrane 15, which can be applied with absolute precision.

Similarly, the tread sole 13 may be shaped to accommodate the insert. Precision in positioning is in fact assisted by the very shape of the insert/mid-sole 14, which is perimetrically shaped substantially complementary to the remaining components of the sole in or between which it must be accommodated.

The assembly of the membrane 15 allows to leave the largest possible vapor-permeable surface without having superimposed elements thereon, consequently increasing the absorbing capabilities of the membrane 15.

With particular reference to FIG. 2, in a constructive different embodiment of the shoe 10 the insert, now designated by the reference numeral 114, comprises a supporting grid 121 above the membrane 115 with the protective layer 116, while the overmolded or superimposed element, now designated by the reference numeral 119, is limited only to the perimetric regions.

The grid 121 gives greater mechanical strength to the shoe, particularly at the insole. If desired the grid 121 may be separately overmolded onto or separately adhered to the membrane or may be an integral portion of superimposed element 119.

With particular reference to FIG. 3, in another different embodiment of the shoe 10 the insert, now designated by the reference numeral 214, comprises, above the membrane 215, a felt 222 (or another highly vapor-permeable filler material in other cases) which is applied in the mold or subsequently and has high-level characteristics in terms of vapor-permeability, moisture absorption, physical weight support and thermal insulation from the outside climate; said characteristics are particularly useful for example in winter shoes, where it is necessary to prevent condensation of the water vapor produced by perspiration due to its cooling.

In particular, in shoes meant for cold environments, the felt 222 or the material having similar characteristics can be combined with films or layers of material which are highly insulating and vapor-permeable or suitably perforated to ensure vapor permeability.

In this case too, the overmolded element 219 affects only the edge regions of the membrane 215 and of the protective element 216.

With reference to FIG. 3bis, the filler layer, now designated by the reference numeral 222a (and made for example of felt), is interposed between an upper spacing layer 222b made of hydrophobic material and a lower layer 222c made of hydrophilic material, both of which are perforated or vapor-permeable.

In this manner, an increase in the absorbing capabilities of the membrane, now designated by the reference numeral 215a is achieved, and therefore in the vapor-permeability of the shoe through the sole.

The layer 222b made of hydrophobic material is in fact meant to propel moisture towards the layer 222c made of hydrophilic material which lies close to the membrane 215a on the opposite side with respect to the protective layer 216a, allowing it to absorb said moisture quickly and to expel it outside, preventing the vapor, before passing through the membrane 215a, from condensing into water, which does not pass through and stagnates inside the shoe.

As an alternative, the two hydrophobic and hydrophilic layers can also enclose, in a sandwich-like fashion, other elements arranged between the foot and the membrane (insole, supports located outside the membrane, etcetera).

It is evident from the illustrations set forth in FIGS. 1,2,3 and 3bis that the supporting/sealing element 19,119,219 may abut the perimetric outer surface of the waterproof membrane, the perimetric edge face of the membrane and the perimetric edge of the protective layer.

With particular reference to FIG. 4, in another different embodiment, in the insert 314 the means for protecting the membrane 315, which is known to be particularly sensitive and susceptible of damage at rough terrain or at foreign objects which can pass through the holes of the tread sole, are constituted, in this case, by one or more elements 316 made of open-cell plastics (for example, materials such as polyurethane or polyethylene or polyester are commercially available), which can offer great resistance to perforation by virtue of their thickness, rigidity and physical characteristics.

The element 316 is also provided in practice with through holes having various orientations, so as to prevent foreign objects from making contact with the membrane 315.

The insert 314 is completed along its perimeter by an element 319 which is overmolded or superimposed like the preceding ones.

Figure 5:
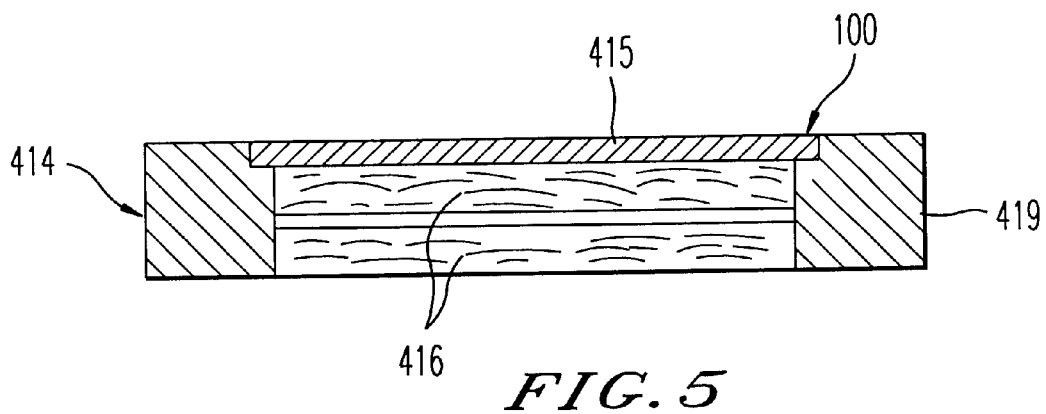

With particular reference to FIG. 5, in a further embodiment of the insert, now designated by the reference numeral 414, the means for protecting the membrane 415 are constituted by one or more elements 416 made of felt which is in turn constituted by fibers resistant to perforation, such as aramid fibers or equivalent fibers.

In this case too, the insert 414 is completed by an element 419 which is overmolded or superimposed.

Figure 6:
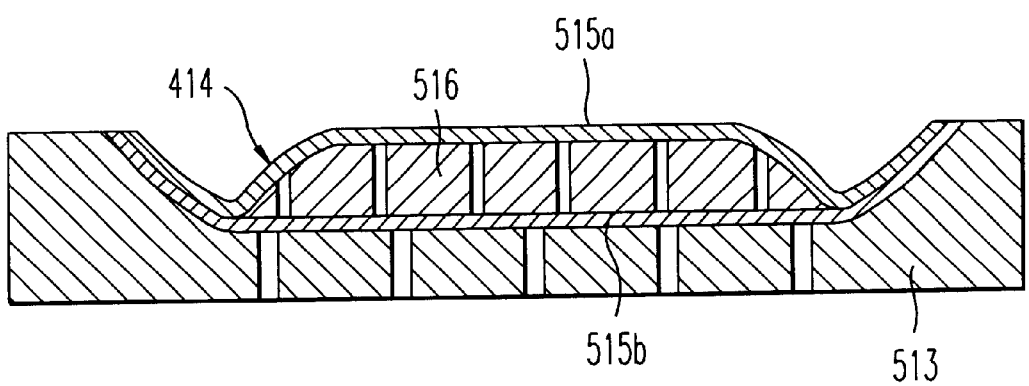
FIG. 6 is a sectional view of another variation of the insert and of the tread sole of the shoe of FIG. 1.

FIG. 6 depicts another embodiment of the insert, now designated by the reference numeral 514, it has a sandwich-like structure which comprises two external membranes 515a and 515b made of waterproof and vapor-permeable material and between which a vapor-permeable and/or perforated structural supporting element 516 is packed.

The membranes 515a and 515b are mutually glued with water-resistant adhesives so as to form a perimetric seal. In this embodiment, in particular, the membrane 515b is more exposed than the other to any damaging action; however, the more protected membrane 515a in any case ensures vapor permeability and yet provides waterproofing of the shoe as a whole, while the other membrane is protected to a certain extent by optional contouring of the tread sole, designated by the reference numeral 513 in this case, to which it is perimetrically sealed or which is overmolded or superimposed thereon.

Figure 7:
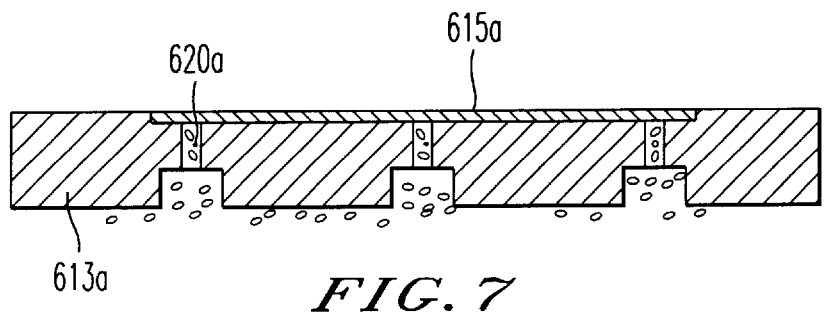
FIGS. 7 and 8 are sectional views of possible embodiments of the tread sole including a membrane.
Figure 8:
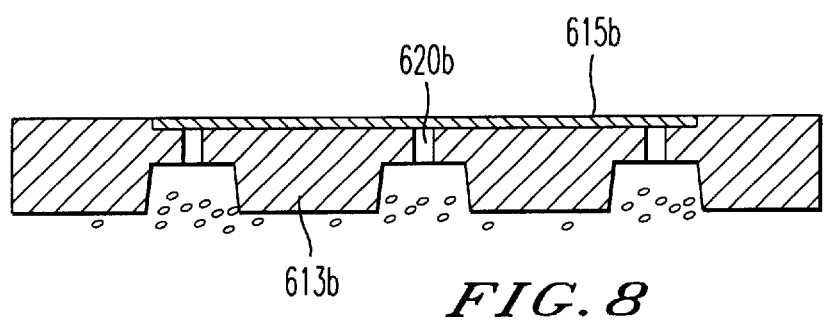

In particular, optional protective contours of the tread sole are visible in FIGS. 7 and 8, which show two tread soles, designated by the reference numerals 613a and 613b respectively, in which the holes, designated by the reference numerals 620a and 620b respectively, are spaced from the region that is in contact with the ground for example by increasing the thickness of the pattern of said tread sole but not the minimum thickness of the material in the perforation points.

The reference numerals 615a and 615b designate the respective membranes.

It should also be noted that in further embodiments the pre-molded insert can also comprise portions of the tread sole.

Figure 9:
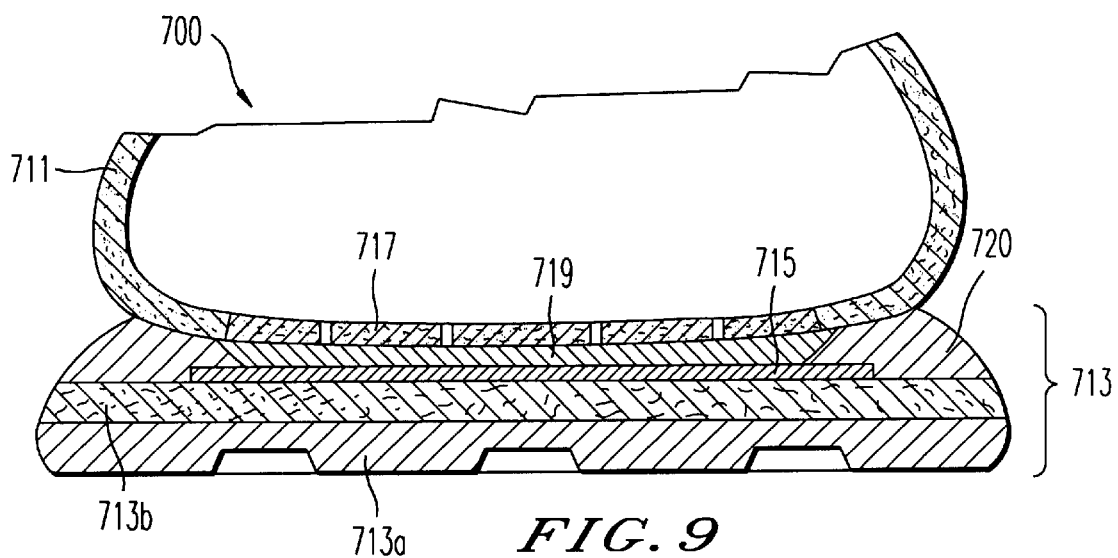
FIG. 9 is a transverse sectional view of another variation of the shoe according to the present invention.

With particular reference to FIG. 9, a constructive variation of the shoe is fully similar to the shoe 10 and is thus generally designated by the reference numeral 700.

In this embodiment, the shoe 700 is provided with means for protecting the membrane 715, which are constituted by a composite tread sole 713.

In particular, the tread sole 713 comprises a waterproof layer 713a, which is in contact with the ground, and an internal layer 713b, which is made of microporous and fully permeable material.

In particular, said layer 713b makes contact with, or in any case faces, the membrane 715, to which it is joined at least in the edge regions (where a seal is provided) by means of an element 720 which joins the entire assembly to the upper 711.

The layer 715b is fully permeable and thus allows the transpiration of water vapor and heat exchange through its edge regions (the other regions are sealed by the lower layer 715a).

The shoe has, above the membrane 715 as well, a filler layer 719 which is vapor-permeable or perforated and a vapor-permeable or perforated insole 717.

Figure 10:
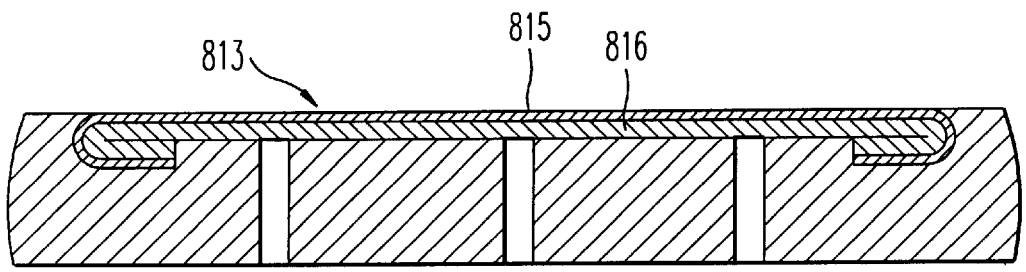
FIG. 10 is a view of a variation of the tread sole with protective membrane.

With particular reference to FIG. 10, a tread sole in a further embodiment is generally designated by the reference numeral 813.

The tread sole 813 has a structure which is substantially similar to the tread sole 13; however, it differs from said structure in that it comprises a membrane 815 which is made of vapor-permeable and waterproof material and is applied to a lower protective layer 816.

The membrane 815 and the protective layer 816 are folded and sealed perimetrically directly to the tread sole 813, which is in any case perforated.

In this case, therefore, the membrane 815 is sealed directly to the tread sole 813.

Coupling to the remaining parts is provided for example as in the case of the shoe 700.

Figure 11:
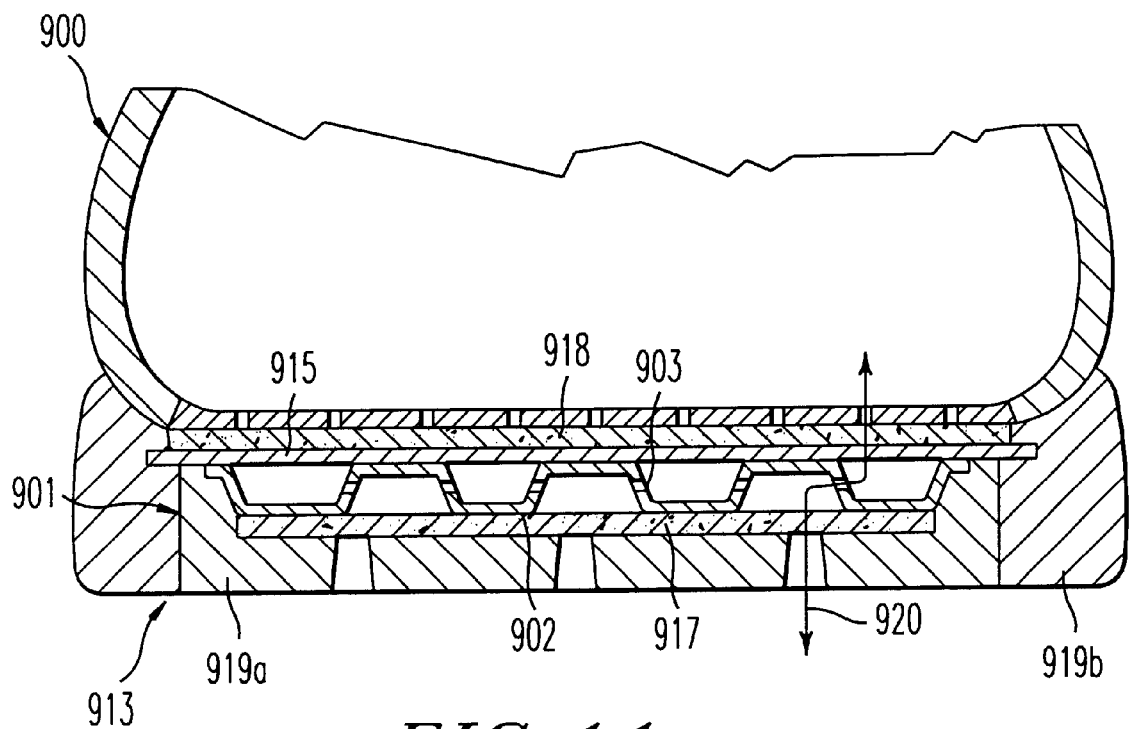
FIG. 11 is a transverse sectional view of a shoe according to the invention in another embodiment.
Figure 12:
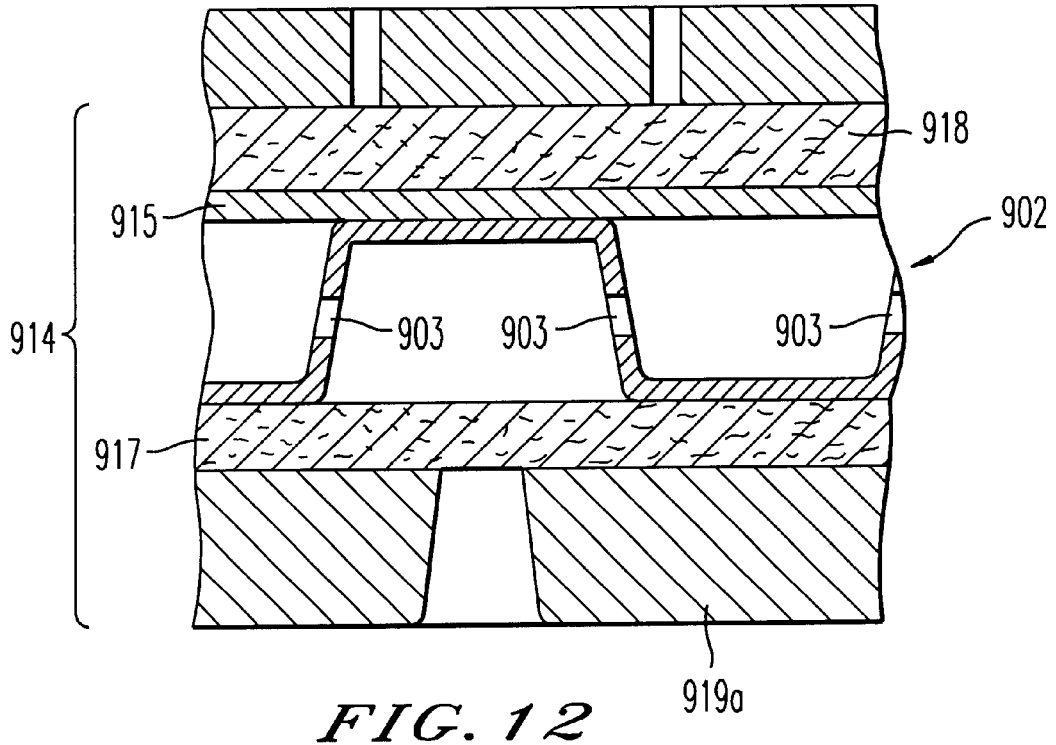
FIG. 12 is an enlarged-scale view of a detail of FIG. 11.

With particular reference to FIGS. 11 and 12, a shoe according to the invention, in another embodiment, is generally designated by the reference numeral 900.

The shoe 900 is particularly suitable for safety applications in work subjected to the risk of intense continuous or momentary stresses affecting the feet.

In particular, the shoe 900 has a structure which is substantially similar to the shoe 10, but it differs from the latter in that it comprises a metallic element 902 which is inserted in the mid-sole, designated by the reference numeral 901 in this case, which is contoured and corrugated so as to increase its structural strength and is provided with holes 903 in which the axis is substantially parallel to the ground and which allow continuity of the vapor-permeability of the shoe 900 as a whole.

As an alternative to the metallic material it is possible to use a different material having the same strength characteristics, such as carbon fiber, fiber-reinforced plastics, etcetera.

In particular, in this case the metallic element 902 is arranged directly below a membrane 915 which is meant to simultaneously provide the vapor-permeable and waterproofing function.

The membrane 915, together with the corrugated metallic element 902, a lower filtering element 917 and a portion 919a of perforated tread sole 913 which is overmolded and seals the perimetric regions, are part of a pre-molded or superimposed insert 914.

An upper filler layer 918 is provided.

The assembly is joined to the rest of the shoe 900 by means of the remaining (perimetric) portion 919b of the tread sole 913, which is overmolded or superimposed.

Vapor-permeability in this shoe occurs for example along the path of the double arrow 920.

In practice, it has been observed that the present invention, in its various embodiments and variations, achieves the intended aim and objects.

In particular, it should be noted that the shoe and insert according to the invention substantially completely solve any difficulties in positioning the membrane during manufacture.

Moreover, the shoe and insert according to the invention also provide for adequate protection of said membrane; accordingly, shoes so prepared can be used also for particularly demanding applications, as for example in the sports field or in the field of safety footwear.

It should also be noted that membrane protection is achieved without compromising in any way the vapor-permeability and waterproofing characteristics of the shoe as a whole.

Attention is also drawn to the flexibility of use of the shoe according to the invention and to the possibility of providing said shoe at costs which are highly competitive with respect to conventional shoes.

It should also be noted that the shoe according to the invention, thanks to its shape and constructive structure, can also be suitable for high-quality embodiments.

The present invention is susceptible of modifications and variations, all of which are within the scope of the inventive concept; the materials may also be any according to requirements.

Obviously, numerous modifications and variations of the present invention are possible in light of the above teachings. It is therefore to be understood that within the scope of the appended claims the invention may be practiced otherwise than as specifically described herein.

What is claimed is:

1. A vapor-permeable shoe comprising:
   a vapor-permeable upper portion having a vapor-permeable or perforated lining;
   a tread sole made of perforated elastomer;
   a mid-sole comprising at least one membrane and a lower protective layer, said at least one membrane being made of waterproof and vapor-permeable materials, said lower protective layer being made of at least one of a hydrolysis resistant material, a water-repellent, a vapor-permeable material and a perforated material;
   a vapor-permeable or perforated insole; and
   a vapor-permeable or perforated filler layer attached to said at least one membrane and said lower protective layer,
   wherein said at least one membrane, together with said lower protective layer, is disposed in a preassembled insert, to which it is sealed at its perimetric regions, and which has said lower protective layer disposed at a lowermost face of said insert, said insert being suitable to form a support for said at least one membrane both during assembly and during use.

2. A vapor-permeable shoe according to claim 1, herein said insert is pre-molded.

3. A vapor-permeable shoe according to claim 1, wherein said vapor-permeable or perforated filler layer is made of plastics overmolded on said at least one membrane and lower protective layer of said insert.

4. A vapor-permeable shoe according to claim 1, wherein said insert comprises a grid which supports said insole and constitutes said vapor-permeable or perforated filler layer, said grid being disposed above said at least one membrane.

5. A vapor-permeable shoe according to claim 1, wherein said insert comprises an element made of vapor-permeable felt which constitutes said vapor-permeable or perforated filler layer, absorbs moisture, has good mechanical characteristics and provides thermal insulation from the outside climate, said element made of vapor-permeable felt being disposed above said at least one membrane.

6. A vapor-permeable shoe according to claim 1, wherein a plurality of layers of materials are provided above said at least one membrane, said plurality of layers comprising an upper layer of hydrophobic material and a lower layer of hydrophilic material, both of which are vapor-permeable or perforated.

7. A vapor-permeable shoe according to claim 6, wherein a spacer layer is interposed between said upper and lower layers.

8. A vapor-permeable shoe according to claim 1, wherein said protective layer comprises one or more elements disposed below said at least one membrane, shaped complementary thereto and made of microperforated open-cell plastic material.

9. A vapor-permeable shoe according to claim 1, wherein said lower protective layer of said at least one membrane comprises one or more felts disposed below said at least one membrane and made of vapor-permeable textile materials resistant to mechanical stresses.

10. An insert for a sole portion of a vapor-permeable shoe, said insert comprising:

a membrane made of waterproof and vapor-permeable materials, said membrane having an upper surface which faces in a direction of a shoe insole, a lower surface which faces in a direction of a shoe sole tread, an outer edge, and a peripheral portion which comprises at least one of a portion of the upper surface adjacent to the outer edge, a outer edge portion, a portion of the lower surface adjacent to the outer edge;

a protective layer disposed adjacent to the lower surface of said membrane and being disposed at a lowermost face of said insert; and a support element disposed at said peripheral portion of said membrane, said support element being bonded to said membrane such that a waterproof bond is formed between the peripheral portion of said membrane and the support element whereby said membrane is sealed at its periphery to said support element.

11. An insert as set forth in claim 10, wherein said protective layer is spot-bonded to said membrane.

12. An insert as set forth in claim 11, wherein said protective layer comprises at least one textile material resistant to mechanical stress.

13. An insert as set forth in claim 10, wherein said support element is overmolded on said membrane.

14. An insert as set forth in claim 10, wherein said support element is bonded to said membrane by gluing.

15. An insert as set forth in claim 10, wherein said insert further comprises a support grid portion bonded to a top surface of said membrane.

16. An insert as set forth in claim 15, wherein said support grid and said support element are integral with each other.

17. A vapor-permeable shoe comprising:

a vapor-permeable upper portion having a vapor-permeable or perforated lining;

a tread sole made of perforated elastomer;

a mid-sole comprising at least one membrane and a lower protective layer, said at least one membrane being made of waterproof and vapor-permeable materials, said lower protective layer being made of at least one of a hydrolysis resistant material, a water-repellent, a vapor-permeable material and a perforated material;

a vapor-permeable or perforated insole; and a vapor-permeable or perforated filler layer disposed between said insole and said at least one membrane, said at least one membrane, together with said lower protective layer, being disposed in a preassembled insert, to which it is sealed at its perimetric regions, said insert being suitable to form a support for said at least one membrane both during assembly and during use.

18. A vapor-permeable shoe according to claim 17, said insert is pre-molded.

19. A vapor-permeable shoe according to claim 17, wherein said insert comprises an element made of plastics which is overmolded on the at least one membrane and lower protective layer of said insert, said element made of plastics being disposed at least in its perimetric regions.

20. A vapor-permeable shoe according to claim 17, wherein said insert comprises a grid supporting said insole and constituting said vapor-permeable or perforated filler layer, said grid being disposed above said at least one membrane.

21. A vapor-permeable shoe according to claim 17, wherein said insert comprises an element made of vapor-permeable felt which constitutes said vapor-permeable or perforated filler layer, absorbs moisture, has good mechanical characteristics and provides thermal insulation from the outside climate, said element made of vapor-permeable felt being disposed above said at least one membrane.

22. A vapor-permeable shoe according to claim 17, wherein a plurality of layers of material are provided above said at least one membrane, said plurality of layers comprising an upper layer of hydrophobic material and a lower layer of hydrophilic material, both of which are vapor-permeable or perforated.

23. A vapor-permeable shoe according to claim 22, wherein a spacer layer is interposed between said upper and lower layers.

24. A vapor-permeable shoe according to claim 17, wherein said lower protective layer comprises one or more elements provided below said at least one membrane, shaped complementary thereto and made of microperforated open-cell plastic material.

25. A vapor-permeable shoe according to claim 17, wherein said lower protective layer of said at least one membrane comprises one or more felts provided below said at least one membrane and made of vapor-permeable textile materials resistant to mechanical stresses.

26. A vapor-permeable shoe according to claim 17, wherein said insert comprises two membranes made of vapor-permeable and waterproof materials, between which an internal structural stiffening layer is interposed, said two membranes being sealed together and to the tread sole at the perimetric regions.

27. A vapor-permeable shoe according to claim 17, wherein said insert comprises portions of said tread sole.

28. A vapor-permeable shoe according to claim 17, wherein said insert comprises a structural supporting element having a corrugated cross-section and being provided with transverse holes that ensure the continuity of the overall vapor-permeability of said shoe, said structural supporting element being disposed directly below said membrane.

29. A vapor-permeable shoe according to claim 28, said insert comprises said membrane, said structural supporting element, a filtering element and a tread sole portion from top to bottom in succession.

30. A vapor-permeable shoe according to claim 17, wherein said structural supporting element is made of a material selected from the group consisting of metal, carbon fiber composite and fiber reinforced plastic composite.

31. A shoe comprising:

a vapor-permeable upper portion having a vapor-permeable or perforated lining;

a tread sole;

a mid-sole comprising at least one membrane and a lower protective layer, said at least one membrane being made of waterproof and vapor-permeable materials, said lower protective layer being made of at least one of a hydrolysis resistant material, a water-repellent, a vapor-permeable material and a perforated material;

a vapor-permeable or perforated insole; and a vapor-permeable or perforated filler layer disposed between said insole and said at least one membrane, wherein said tread sole is a composite having a lower tough and waterproof layer which is in contact with the ground during use and an upper region having a layer permeable to heat and moisture which faces said at least one membrane upon assembly, said vapor-permeable or perforated filler layer allowing transpiration through its perimetric edge in contact with the outside.

32. A shoe comprising:

a vapor-permeable upper portion having a vapor-permeable or perforated lining;

a tread sole made of perforated elastomer;

a mid-sole comprising at least one membrane and a lower protective layer, said at least one membrane being made of waterproof and vapor-permeable materials, said lower protective layer being made of at least one of a hydrolysis resistant material, a water-repellent, a vapor-permeable material and a perforated material;

a vapor-permeable or perforated insole; and a vapor-permeable or perforated filler layer arranged between said insole and said at least one membrane, wherein said at least one membrane and said lower protective layer are folded inwardly at the perimetric regions and said at least one membrane is directly sealed to the tread sole.

33. An insert for a sole portion of a vapor-permeable shoe, said insert comprising:

a membrane made of waterproof and vapor-permeable material, said membrane having an upper surface which faces in a direction of a shoe insole, a lower surface which faces in a direction of a shoe sole tread, an outer edge, and a peripheral portion which comprises at least one of a portion of the upper surface adjacent to the outer edge, a outer edge portion, a portion of the lower surface adjacent to the outer edge;

a protective layer disposed adjacent to the lower surface of said membrane at a lowermost face of the insert; and a support element disposed at said peripheral portion of said membrane, said support element being bonded to said membrane such that a waterproof bond is formed between the peripheral portion of said membrane and the support element whereby said membrane is sealed at its periphery to said support element.

34. An insert as set forth in claim 33, wherein said protective layer is spot-bonded to said membrane.

35. An insert as set forth in claim 34, wherein said protective layer is comprised of textile materials resistant to mechanical stress.

36. An insert as set forth in claim 33, wherein said support element is overmolded on said membrane.

37. An insert as set forth in claim 33, wherein said support element is bonded to said membrane by gluing.

38. An insert as set forth in claim 33, wherein said insert further comprises a support grid portion bonded to the top surface of said membrane.

39. An insert as set forth in claim 38, wherein said support grid and said support element are integral with each other.

* * * * *